Jan. 9, 1968 W. ZLOCZOWER 3,363,153
SOLID STATE TRIODE HAVING GATE ELECTRODE THEREIN
SUBTENDING A PORTION OF THE SOURCE ELECTRODE
Filed June 1, 1965
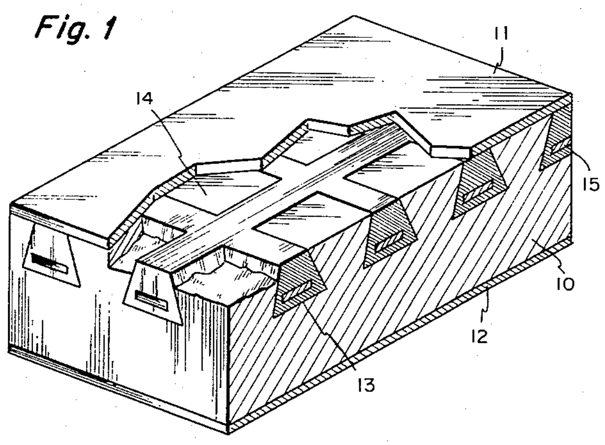
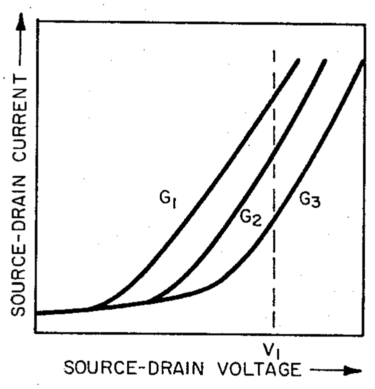
Fig. 3.
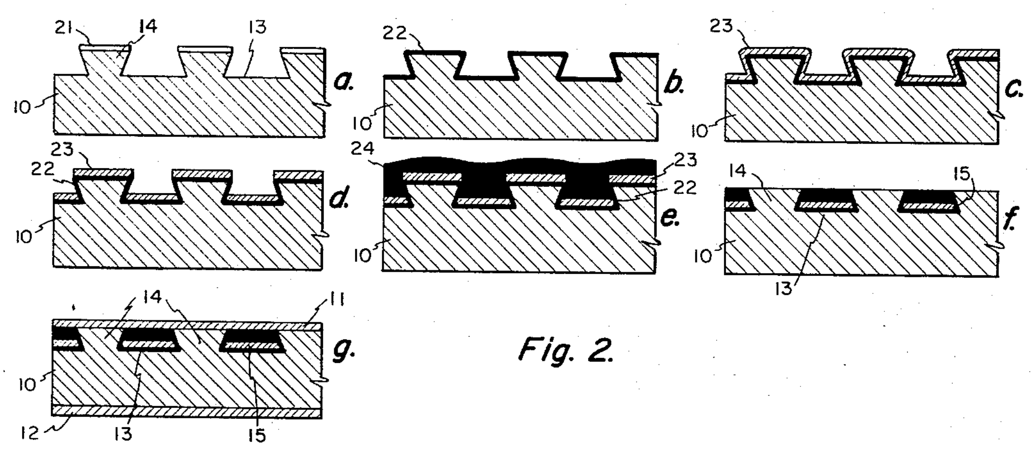
Fig. 2.
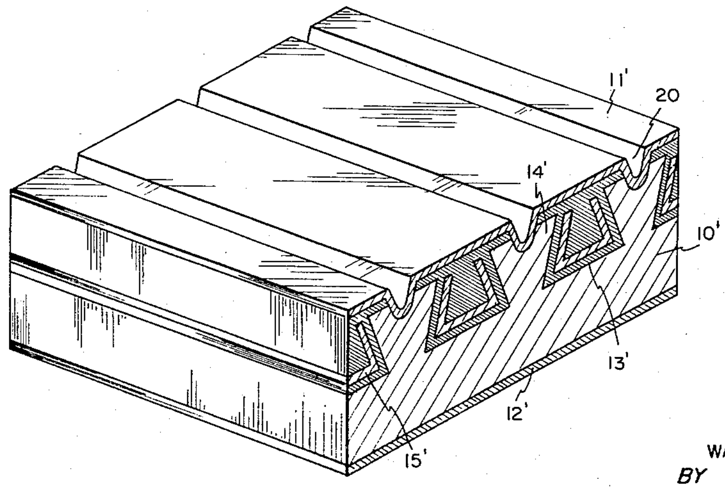
Fig. 4.
INVENTOR.
WALTER ZLOCZOWER
BY R. J. Frank
ATTORNEY.

United States Patent Office 3,363,153
Patented Jan. 9, 1968

3,363,153
SOLID STATE TRIODE HAVING GATE ELECTRODE THEREIN SUBTENDING A PORTION OF THE SOURCE ELECTRODE

Walter Zloczower, Glen Cove, N.Y., assignor to General Telephone and Electronics Laboratories, Inc., a corporation of Delaware
Filed June 1, 1965, Ser. No. 460,276
8 Claims. (Cl. 317—235)

ABSTRACT OF THE DISCLOSURE

The invention relates to a solid state semi-conductor triode having the gate electrode within the body and conductively isolated from the semiconductor material between the source and drain electrodes. The combination comprises pedestals tapered toward their base where the gate electrode is disposed.

This invention relates to semiconductor devices and in particular to a solid state space-charge-limited triode.

The solid state space-charge-limited triode relies for its operation upon the injection of a mobile space charge into the conduction or valence band of a semi-insulating solid, and the modulation of the space charge therein by a control electrode placed within the solid. This operation is similar to that of a vacuum tube triode wherein the plate current is dependent on the potential distribution between the plate and cathode electrodes, which in turn is determined by the amount and distribution of the space charge in the interelectrode space.

In the vacuum triode, the grid electrode is perforated and positioned between the plate and cathode with the result that variations in the grid potential vary the potential distribution and therefore control the plate current. However, a solid-state triode having a space-charge-limited current requires that certain conditions not present in vacuum tubes be fulfilled by the material and the structure of the device.

The semi-insulating solid employed must exhibit a relatively high resistance and permittivity so that the dielectric relaxation time, which is a function of the product thereof, is longer than the transit time of the injected carriers between a first or source electrode and a second or drain electrode. The dielectric relaxation time is a measure of the time required for the injected space-charge to decay and attain neutrality in a material, and except for very poorly conducting materials, is quite short. If the space charge is permitted to decay, only drift currents will be obtained.

The transit time of the injected carriers is a function of the distance between the source and drain, the mobility of the injected carriers, and the source to drain voltage. And for a given material having a particular source-drain spacing, equating the transit time with the dielectric relaxation time establishes a threshold voltage below which essentially no space-charge exists. This voltage is obtained from the following expression:

$$V_{th}=\frac{ned^2}{\epsilon}$$

where $n$ is the density of the injected carriers, $e$ is the electronic charge, $d$ is the source-drain spacing, and $\epsilon$ is the absolute permittivity of the material employed.

Although the threshold voltage does not depend upon the carrier mobility, high mobility is desirable to enhance the space-charge-limited current at a given applied voltage. This is shown by the current density expression found to exist for the space-charge-limited region:

$$J=\frac{9\epsilon\mu V^2}{8d^3}$$

where $\mu$ is the carrier mobility and V is the source-drain voltage.

The above equations point out the desirability of small interelectrode spacings, high resistivity and permittivity, and high carrier mobility. As known in the art, high carrier mobility of the order of $10^3$ cm.$^2$/volt-sec. generally requires that single crystal materials be employed Polycrystalline materials have been found to exhibit substantially lower carrier mobilities due to the presence of grain boundaries and surface effects.

However, the practical requirement of single crystal material for space-charge-limited triodes has been found to impose serious limitations on the types of structures that can be fabricated by conventional thin-film and graphic arts techniques. These limitations arise primarily from the fact that the amplification factor $m$ of the triode is found to be equal to the ratio $C_G/C_d$, where $C_G$ and $C_d$ refer to the gate-source and drain-source capacitances respectively. And, the transconductance $g_m$ is equal to $C_G/\tau$, where $\tau$ is the carrier transit time. It is noted that $C_G$ should be maximized in order to provide optimum triode performance characteristics.

To this end, it would be desirable to incorporate a perforated insulated gate structure within the semi-insulating material between the source and drain electrodes. This construction would then provide a relatively large common area between the source and gate electrodes to insure a high gate-source capacitance. However, this type of sandwich structure generally requires that a portion of the semi-insulating layer be formed initially with the insulated gate structure placed thereon, and a covering of a semi-insulating material formed on the exposed surface of the gate. This mode of construction precludes the use of single crystal material due to the extreme difficulty of providing crystal uniformity throughout the second formed covering.

In order to overcome the structural limitations imposed by the use of single crystal material, a coplanar triode has been poposed in which the source and drain are formed on one side of the material with the gate being formed on the opposing side in registration with the source-drain gap. However, the small interelectrode spacings of about 1 mil or less required for short transit times and high current densities are difficult to obtain with conventional fabrication techniques. This difficulty is due in part to the necessity of using two extremely fine masks on opposing surfaces of a wafer and maintaining them in essentially exact registration. In addition, the above problem is rendered more severe during the formation of a plurality of individual space-charge-limited triodes wherein large masks must be maintained in registration.

Accordingly, an object of the present invention is the provision of a single crystal space-charge-limited triode capable of fabrication by conventional graphic arts techniques.

Another object is the provision of a solid state space-charge-limited triode requiring only a single masking operation.

A further object is to provide a single crystal space-charge-limited triode having improved performance characteristics.

In accordance with the present invention, a plurality of space-charge-limited triodes are formed on a wafer of single crystal semi-insulating material. The wafer material is selected to exhibit a resistivity of at least $10^3$ ohm/cm. and an absolute permittivity of about 10 so that the threshold voltage required to obtain space-charge-limited current is relatively low for interelectrode spacings large enough to permit fabrication by present techniques. In addition, the wafer material should exhibit a relatively high carrier mobility of at least 100 cm.$^2$/volt-sec. to provide relatively short carrier transit times between the electrodes.

Upon one surface of the wafer, a plurality of inwardly tapered pedestals wherein the small area surface thereof comprises the base are formed by masking the surface and then employing controlled etching techniques, such as etching with a spray positioned at an angle with respect to the wafer surface. This provides the undercut necessary for the inward taper. The etched surface is then completely covered by an insulating layer which is then metallized.

The inwardly tapered pedestals are then etched on the sides to remove the metal previously deposited thereon. Then the area between pedestals is completely filled with a second insulating layer followed by a surface polishing to remove all material from the top surface of the pedestals. At this point, a uniform source electrode can be applied to the polished surface and a corresponding drain electrode applied to the opposing wafer surface. The metal remaining at the base of each pedestal comprises a uniform gate electrode, to which external connection may be made at the end of the wafer.

The application of a voltage, exceeding the threshold voltage of the material, between the source and drain electrodes results in a space-charge-limited current flowing therebetween. This space-charge is located near the source electrode in the inwardly tapered pedestals. The position of this space-charge determines the amount of source-drain current and can be varied by establishing a modulating field between the gate and source.

The position of the gate electrode at the base of the pedestals in combination with the taper thereof results in the gate electrode subtending a portion of the source electrode to provide an effective gate-source capacitance. It is this capacitance which modulates the source-drain current and determines the amplification factor and transconductance.

Since the purpose of the gate electrode is only to establish a field that influences the location of the space charge, the gate can be insulated from the rest of the structure to minimize gate current flow. Also, the addition of the insulating film permits either polarity gate voltage.

Further features and advantages of the invention will become more readily apparent from the following description of specific embodiments taken in conjunction with the accompanying drawings in which:

FIG. 1 is a perspective view in partial section of one embodiment of the invention;

FIGS. 2*a* through 2*g* are side views in section showing the fabrication of the embodiment of FIG. 1;

FIG. 3 shows representative operating characteristics for the embodiment of FIG. 1; and FIG. 4 is a perspective view in partial section of a second embodiment of the invention.

Referring to the embodiment of FIG. 1, a plurality of space-charge-limited triodes are shown formed in an integral structure on a wafer 10 of single crystal semi-insulating material.

The space-charge-limited triode relies on the establishment of a space-charge in the wafer by the injection of carriers, in this case electrons, from a source electrode into the conduction band of the wafer material. If the transit time of the carriers is less than the dielectric relaxation time of the wafer material, space-charge-limited currents can be established in the wafer. The dielectric relaxation time of a material is determined by the product of the resistivity and permittivity, while the transit time is determined by the carrier mobility and the interelectrode spacing.

Accordingly, to attain practical interelectrode spacing, the semi-insulating material is required to have a resisttivity of at least $10^3$ ohm/cm., a carrier mobility of at least 100 cm.$^2$/volt-sec. and a relative permittivity of about 10. The permittivity of most semi-insulators has been found not to vary appreciably from 10. Suitable single crystal materials satisfying the above requirements are, for example, high purity silicon and cadmium sulfide.

The construction of the embodiment of FIG. 1 is illustrated in FIGS. 2*a* through 2*g*. Initially, the wafer 10 is masked with a suitable photoresist 21 and an array of spaced, substantially orthogonal channels 13, are etched therein. It will be noted that the sides of the channels are undercut during the etching operation. The undercutting can be attained by spray etching with the spray being directed at angles other than 90 degrees with respect to the wafer surface. Generally by decreasing the angle of the spray, the amount of the undercut expressed in terms of the height of the inwardly tapered pedestals 14 formed between channels is increased. And to provide structural rigidity for the pedestals, the preferred range of undercutting is found to be about 20 percent.

After the photoresist is removed, an insulating layer 22, shown in FIG. 2*b*, is deposited by conventional techniques on the exposed surfaces of the pedestals 14 and channels 13. The insulating layer may be silicon dioxide or the equivalent.

Next the surface of the insulating layer is metallized by the deposition of a suitable conducting layer 23, such as aluminum, from a source positioned directly above the wafer surface. This results in a conducting layer of non-uniform thickness being formed on the exposed surface of the insulating layer. The thickness of the conducting material deposited on the tapered sides of the pedestals 14 is substantially less than that deposited in the bottom of the channels 13 as shown in FIG. 2*c*. The wafer is then exposed to an etchant which removes substantially equal amounts of conducting material from the different surfaces. This technique results in the portion of the thin conducting layer on the tapered sides of the pedestals being removed while the thicker portion on the channel bottom, which comprises gate electrode 15, remains substantially intact.

Further, a second insulating layer 24 is deposited to completely fill the channels as shown in FIG. 2*e*. The surface of the wafer is then polished to expose the semi-insulating surface of the pedestals. The structure is then completed by depositing uniform source 11 and drain 12 electrodes on the opposing surfaces of wafer 10. The integral structure so formed is then as shown in FIG. 1.

It will be noted that the plurality of triodes can be formed by using a mask only once, at the formation of the channels, and therefore any registration problems are obviated. This is of particular importance since the interelectrode spacing, i.e. source to drain distance, must of necessity be kept small to provide short transit times. For example in the embodiment shown, the source to drain distance was chosen to be about 0.8 mil, the pedestal height about 0.2 mil, and the pedestal width about 0.2 mil.

The source-gate capacitance determines both the amplification factor and transconductance of the triode since the electric field established therebetween is used to vary the location of the space-charge and modulate th source-drain current. This capacitance is established in the embodiment by use of a tapered pedestal which permits the gate electrode formed at the bottom of the channels to subtend a portion of the source electrode formed on the top of the pedestal. The subtended area of the source extends around the pedestal which increases the above-mentioned triode characteristics. In addition, the amplification factor is further enhanced by the use of inwardly tapered pedestals which tends to decrease the effective source area substended by the drain electrode and thereby decrease the source-drain capacitance.

The curves of FIG. 3 illustrate the operating characteristics of either one or a plurality of space-charge-limited triodes. In the case of electron carriers, curves $G_1$, $G_2$ and $G_3$ show the effect of increasingly negative gate voltages. Thus for a constant source-drain voltage, such as $V_1$, the gate voltage effectively modulates the source-drain current. Although the described embodiment employs an insulated gate electrode to permit bipolar gate operation, a non-injecting gate electrode may be deposited directly on the bottom of the channel if unipolar operation is desired. It will be noted that this construction eliminates the deposition of the first insulating layer.

A second embodiment, similar to the previously described embodiment, is shown in FIG. 4. This structure requires an additional step to be performed during the formation of the channel, that of etching a cup or depression 20 in the top of each pedestal.

To form both the channels 13' and the depressions 20, a suitable mask is applied and the depressions are etched to the desired depth by a spray source positioned directly above the wafer surface. This results in a partial etch of the channels without the desired undercut. Then, a suitable resin is applied to the formed depressions but not to the partially formed channels and the channels are spray etched by an angularly directed spray source. This technique enables the etching to be performed with only a single masking operation.

A first insulating layer is then deposited in the channels 13' and a conducting layer formed therein similar to that of the embodiment of FIG. 1. However it is no longer necessary to remove the portion of the conducting layer or gate electrode 15' that is formed on the sides of the pedestals. The channels are then filled with insulating material to complete the formation of the insulated gate electrodes.

After formation of the gate electrodes 15' and the filling of the channels 13' with insulating material, the depressions are cleaned of the resin by using an organic solvent and a uniform source 11' electrode deposited on the surface. It will be noted that the portion of the source electrode 11' on each pedestal 14' that is subtended in a parallel manner by the gate electrode is substantially increased by the depressions 20 formed on the top of each pedestal. Thus, the effective source-gate capacitance is likewise increased and the performance characteristics enhanced.

While the above discussion has referred to specific embodiments, it is recognized that many modifications and departures may be made thereon without departing from the spirit and scope of the invention.

What is claimed is:

1. A solid state space-charge-limited triode which comprises
(a) a wafer of single crystal semi-insulating material;
(b) a plurality of spaced tapered pedestals formed on one surface of said wafer with the small area surface of said pedestals being the base thereof and integrally joined to the wafer;
(c) a body of electrically insulating means disposed within the space between said pedestals;
(d) a source electrode formed on the top surface of said pedestals;
(e) a drain electrode formed on the opposing surface of said wafer whereby the application of a voltage between said source and drain electrodes produces a space-charge-limited current therebetween; and
(f) a gate electrode imbedded in said insulating means proximate to and around the base of each of said pedestals and positioned to subtend a portion of said source electrode whereby a voltage applied to said gate electrode establishes an electric field between said source and said gate electrodes to vary the field force of said space charge and modulate the current flow in said pedestals between the source and drain electrodes.

2. A solid state space-charge-limited triode which comprises
(a) a wafer of single crystal semi-insulating material having a resistivity at least as large as $10^3$ ohm/cm. and a carrier mobility of at least 100 cm.$^2$/volt-sec.;
(b) a plurality of spaced tapered pedestals formed on one surface of said wafer with the small area surface of said pedestals being the base thereof and integrally joined to the wafer;
(c) a source electrode formed on the top surface of said pedestals;
(d) a drain electrode formed on the opposing surface of said wafer whereby the application of a voltage between said source and drain electrodes produces a space-charge-limited current therebetween; and
(e) a non-injecting gate electrode formed on said wafer proximate to and around the base of each of said pedestals and positioned to subtend a portion of said source electrode whereby a voltage applied to said gate electrode establishes an electric field between said source and said gate electrodes to vary the field force of said space charge and modulate the current flow in said pedestals between the source and drain electrodes.

3. A solid state space-charge-limited triode which comprises
(a) a wafer of single crystal semi-insulating material having a resistivity at least as large as $10^3$ ohm/cm. and a carrier mobility of at least 100 cm.$^2$/volt-sec;
(b) a plurality of spaced tapered pedestals formed on one surface of said wafer with the small area surface of said pedestals being the base thereof and integrally joined to the wafer;
(c) a source electrode formed on the top surface of said pedestals;
(d) an insulating layer formed on the side of said tapered pedestals and on the adjacent surface of said wafer;
(e) a drain electrode formed on the opposing surface of said wafer whereby the application of a voltage between said source and drain electrodes produces a space-charge-limited current therebetween; and
(f) a gate electrode formed on said insulating layer proximate to and around the base of each of said pedestals and positioned to subtend a portion of said source electrode whereby a voltage applied to said gate electrode establishes an electric field between said source and said gate electrodes to vary the field force of said space charge and modulate the current flow in said pedestals between the source and drain electrodes.

4. A solid state space-charge-limited triode which comprises
(a) a wafer of single crystal semi-insulating material having a resistivity at least as large as $10^3$ ohm/cm. and a carrier mobility of at least 100 cm.$^2$/volt-sec;
(b) a plurality of spaced tapered pedestals formed on one surface of said wafer with the small area surface of each of said pedestals being the base thereof and integrally joined to the wafer;
(c) source electrode means formed on the top surface of each of said pedestals;
(d) an insulating layer formed on the side of each of said pedestals and on the adjacent surface of said wafer;
(e) drain electrode means formed on the opposing surface of said wafer whereby the application of a voltage between said source and drain electrode means produces a space-charge-limited current therebetween; and
(f) gate electrode means formed on said insulating layer proximate to and around the base of each of said pedestals and positioned to subtend a portion of the source electrode means whereby a voltage applied to said gate electrode means establishes an electric field between said source and gate means to vary the field force of said space charge and modulate the current flow in said pedestals between the source and drain means.

5. A solid state space-charge-limited triode which comprises (a) a wafer of single crystal semi-insulating material having a resistivity at least as large as $10^3$ ohm/cm. and a carrier mobility of at least 100 cm.$^2$/volt-sec;

(b) a plurality of spaced inwardly tapered pedestals formed on one surface of said wafer with the small area surface of each of said pedestals being the base thereof and integrally joined to the wafer, said pedestals being spaced to form a plurality of channels in said wafer;

(c) source electrode means formed on the top surface of each of said pedestals;

(d) drain electrode means formed on the opposing side of said wafer whereby the application of a voltage between said source and drain electrode means produces a space-charge-limited current therebetween;

(e) an insulating layer formed within the channels between said pedestals; and (f) gate electrode means formed within said channels and insulated from said wafer by said insulating layer, said gate electrode means being positioned proximate to and substantially covering the bottom of said channel to subtend a portion of the source electrode means whereby a voltage applied to said gate electrode means establishes an electric field between said source and gate means to vary the field force of said space charge and modulate the current flow in said pedestals between the source and drain means.

6. A solid state space-charge-limited triode which comprises (a) a wafer of single crystal silicon having a resistivity at least as large as $10^3$ ohm/cm. and a carrier mobility of at least 100 cm.$^2$/volt-sec;

(b) a plurality of tapered pedestals formed on one surface of said wafer with the small area surface of each of said pedestals being the base thereof and integrally joined to the wafer, said pedestals being spaced to provide a plurality of channels in said wafer, said pedestals having an inward taper of about 20 percent;

(c) source electrode means formed on the top surface of each of said pedestals;

(d) drain electrode means formed on the opposing side of said wafer whereby the application of a voltage between said source and drain electrode means produces a space-charge-limited current therebetween;

(e) an insulating layer formed within and substantially filling said channels; and (f) gate electrode means formed within said insulating layer, said gate electrode means being positioned proximate to and substantially covering the bottom of said channel to subtend a portion of the source electrode means whereby a voltage applied to said gate electrode means establishes an electric field between said source and gate means to vary the field force of said space charge and modulate the current flow in said pedestals between the source and drain means.

7. A solid state space-charge-limited triode which comprises (a) a wafer of single crystal semi-insulating material having a resistivity at least as large as $10^3$ ohm/cm. and a carrier mobility of at least 100 cm.$^2$/volt-sec;

(b) a plurality of spaced inwardly tapered pedestals formed on one surface of said wafer with the small area surface of each of sadi pedestals being the base thereof and integrally joined to the wafer, said pedestals being spaced to form a plurality of channels in said wafer;

(c) a plurality of depressions each of which is formed in the top surface of one of said pedestals;

(d) source electrode means formed within said depressions;

(e) drain electrode means formed on the opposing side of said wafer whereby the application of a voltage between said source and drain electrode means produces a space-charge-limited current therebetween;

(f) an insulating layer formed on the sides and bottom of said channels; and (g) gate electrode means formed on said insulating layer proximate to and around the base of each of said pedestals and positioned to subtend a portion of the source electrode means whereby a voltage applied to said gate electrode means establishes an electric field between said source and gate means to vary the field force of said space charge and modulate the current flow in said pedestals between the source and drain means.

8. A solid state space-charge-limited triode which comprises (a) a wafer of single crystal silicon having a resistivity at least as large as $10^3$ ohm/cm. and a carrier mobility of at least 100 cm.$^2$/volt-sec;

(b) a plurality of tapered pdestals formed on one surface of said wafer with the small area surface of each of said pedestals being the base thereof and integrally joined to the wafer, said pedestals being spaced to provide a plurality of channels in said wafer, said pedestals having an inward taper of about 20 percent;

(c) a plurality of depressions each of which is formed in the top surface of one of said pedestals;

(d) source electrode means formed within said depressions;

(e) drain electrode means formed on the opposing side of said wafer whereby the application of a voltage between said source and drain electrode means produces a space-charge-limited current therebetween;

(f) an insulating layer formed on the sides and bottom of said channels; and (g) gate electrode means formed on said insulating layer proximate to and around the base of each of said pedestals and positioned to subtend in a parallel manner a portion of the source electrode means formed within said depressions whereby a voltage applied to said gate electrode means establishes an electric field between said source and gate means to vary the field force of said space charge and modulate the current flow in said pedestals between the source and drain means.

References Cited

UNITED STATES PATENTS 2,930,950 3/1960 Teszner ............ 317—235
3,025,438 3/1962 Wegener ............ 317—235
3,176,203 3/1965 Teszner ............ 317—235

JAMES D. KALLAM, *Primary Examiner.*